United States Patent [19]

Kalt

[11] 4,249,919
[45] Feb. 10, 1981

[54] MATRIX TYPE ELECTROSTATIC PRECIPITATOR

[76] Inventor: Charles G. Kalt, 29 Hawthorne Rd., Williamstown, Mass. 01267

[21] Appl. No.: 972,985

[22] Filed: Dec. 26, 1978

[51] Int. Cl.³ .......................... B03C 3/36; B03C 3/45; B03C 3/64
[52] U.S. Cl. ...................... 55/130; 55/141; 55/155; 55/278
[58] Field of Search ............. 55/130, 136–138, 55/154–156, DIG. 39, 141–143, 145, 278

[56] References Cited

U.S. PATENT DOCUMENTS

| | | | |
|---|---|---|---|
| 2,085,735 | 7/1937 | Brion et al. | 55/137 |
| 2,604,183 | 7/1952 | Richardson | 55/154 X |
| 2,696,893 | 12/1954 | Richardson | 55/138 X |
| 2,885,026 | 5/1959 | Di Vette | 55/154 X |
| 2,997,519 | 8/1961 | Hines et al. | 55/141 X |
| 3,081,215 | 3/1963 | Held et al. | 55/155 X |
| 3,262,250 | 7/1966 | Fowler | 55/142 |
| 3,449,094 | 6/1969 | Baxt et al. | 55/DIG. 39 X |
| 3,487,610 | 1/1970 | Brown et al. | 55/130 |
| 3,740,925 | 6/1973 | Gothard | 55/136 X |
| 3,750,373 | 8/1973 | Olson | 55/155 X |
| 3,765,153 | 10/1973 | Grey | 55/130 X |
| 3,783,588 | 1/1974 | Hudis | 55/DIG. 39 X |
| 3,785,118 | 1/1974 | Robertson | 55/154 X |
| 3,950,153 | 4/1976 | von Berckheim | 55/138 |

FOREIGN PATENT DOCUMENTS

| | | | |
|---|---|---|---|
| 1169413 | 12/1958 | France | 55/154 |
| 380890 | 9/1932 | United Kingdom | 55/154 |
| 892908 | 4/1962 | United Kingdom | 55/136 |
| 931625 | 7/1963 | United Kingdom | 55/138 |

*Primary Examiner*—Kathleen J. Prunner
*Attorney, Agent, or Firm*—Anthony H. Handal

[57] ABSTRACT

An air cleaner (10) adapted to admit a flow of air containing entrained particles and to remove some of the particles from the air and expel the air and any remaining particles comprises a plurality of non-conductive filter elements (22,24). Means (16a, 16b, 18) are provided for supporting the filter elements in spaced relationship to each other. The filter elements define a plurality of macroscopic passages (46) for the flow of air which are very small but not microscopic in size. Means (26) for concentrating electrical charges of opposite polarity on facing surfaces of adjacent filter elements is also provided.

5 Claims, 5 Drawing Figures

U.S. Patent     Feb. 10, 1981     4,249,919
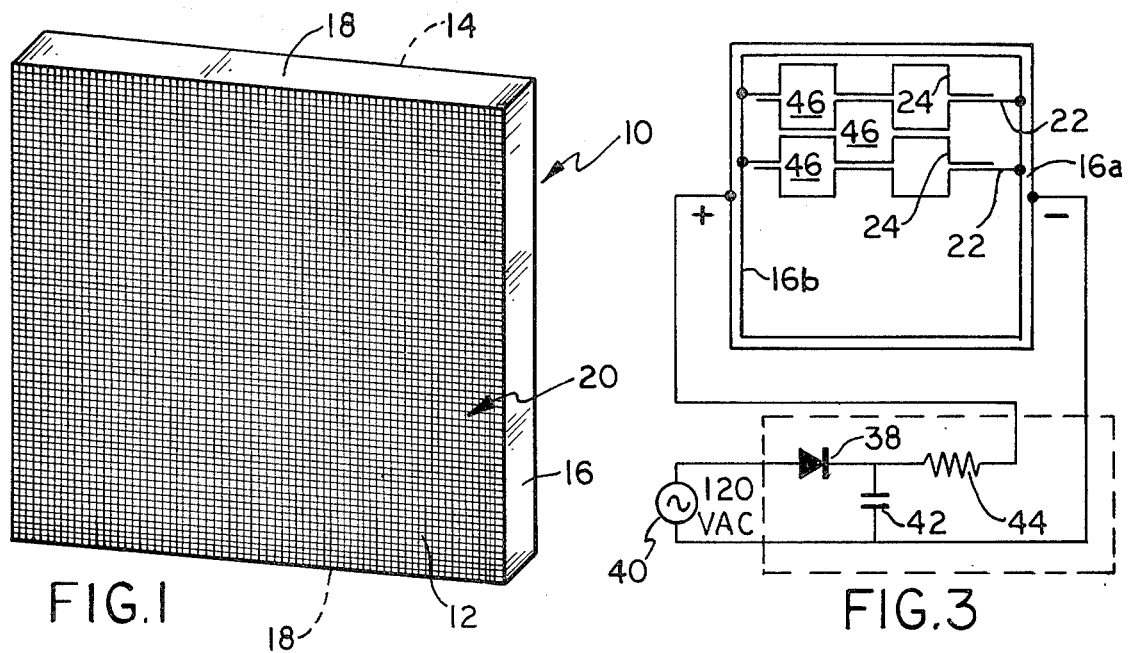
FIG.1
FIG.3
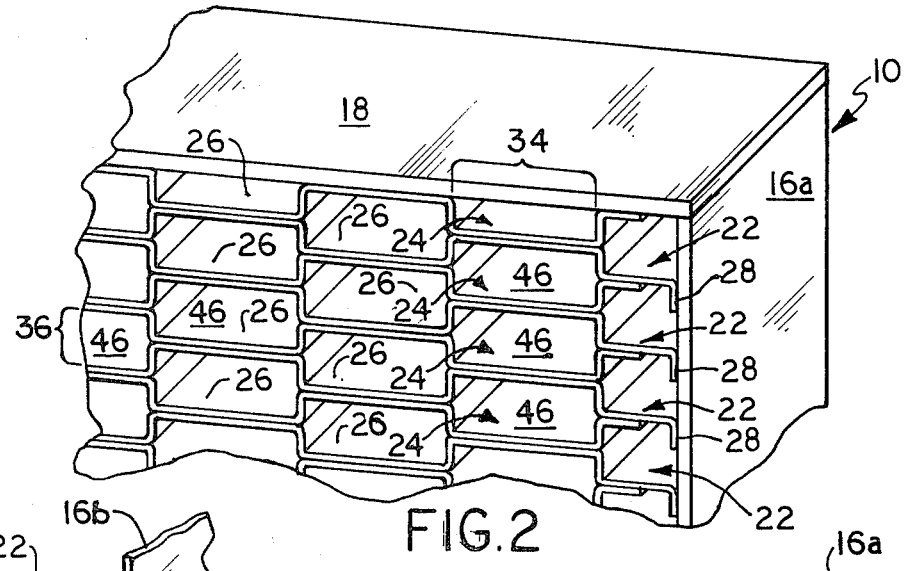
FIG.2
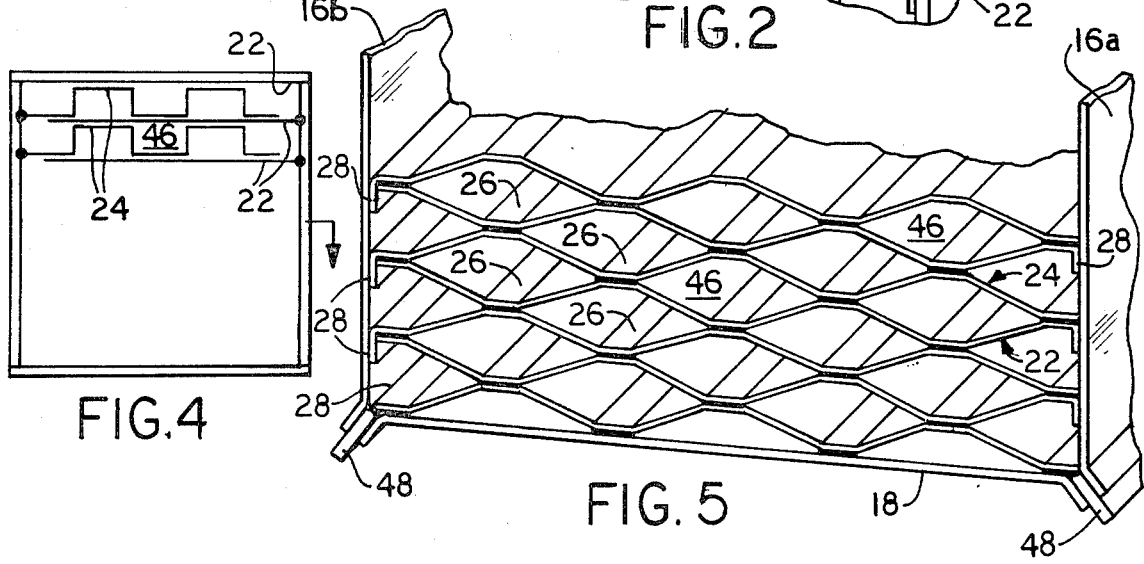
FIG.4
FIG.5

MATRIX TYPE ELECTROSTATIC PRECIPITATOR

TECHNICAL FIELD

The invention relates to air cleaners of the type which include a passage through which air to be cleaned of entrained particles is passed and across which an electric field exists.

BACKGROUND ART

With increasing public awareness of the relatively high levels of air pollution which surround many parts of our nation, there has arisen a growing need for devices capable of cleaning the air. Such devices have a wide variety of applications, ranging from the smokestack where pollutants are produced to the homes of people living near sources of pollution. With regard to home applications, the need is particularly acute, inasmuch as many people are seriously affected by industrial pollutants as well as natural environmental particles such as pollen and the like.

One class of devices which is particularly effective in removing particles, such as pollen and soot, from the air generally includes an emitter which is driven by an extremely high voltage power supply. The emitter usually comprises a mesh of electrically-conductive material. When it is driven with a high voltage, the mesh emits a great quantity of charge which attaches itself to airborne particles thus giving them a charge.

The air to be cleaned is driven through the emitter by a fan or any other suitable apparatus. After being driven through the emitter and having its entrained particles given an electrical charge, the air is then blown into an electrostatic field between positively and negatively charged conducting filter elements. The voltage on the conducting filter elements is very high and, consequently, the entrained charged particles which are blown near them are attracted to and held by the charged filter element. They accumulate on the filter element which must be periodically washed.

Typical examples of such systems include those disclosed in U.S. Pat. Nos. 3,910,779, 2,129,783, 3,988,131, 2,885,026, 2,565,458, 3,950,153, and 3,594,989. While systems of this kind are extremely effective in removing particles from the air (they have efficiencies in the order of 98%), they have a number of distinct disadvantages. The voltages required for both the emitter and the filter itself are extremely high, typically in the order of 40-60 kilovolts. The use of such high voltages necessitates the use of relatively expensive equipment to generate these voltages. Thus, such air filters may be quite expensive. Still another problem is the fact that these filters must be cleaned frequently. This is a time consuming and clumsy operation.

Accordingly, a great deal of work has been expended in seeking alternatives to this type of filter. Perhaps the most common solution is simply to use a fiberglass or other mechanical air filter which is very inexpensive and hence can be disposed of. The use of a fiberglass filter also obviates the need for high voltage generating equipment. Such devices thus only have need of a blower and a filter and are relatively inexpensive. However, their efficiency is very low, typically in the order of about 2%.

Another approach is simply to eliminate the emitter. While the device does lose a good part of its efficiency, it has been noted that the presence of natural charges on air-borne particles is sufficient to cause the collection of about 85% of the particles when they are passed between a pair of oppositely charged conductive filter elements. However, the elimination of the emitter does little to reduce the cost of the device which still requires high voltage generating equipment. Again, the relatively expensive nature of the filter elements necessitates periodic cleaning.

DISCLOSURE OF INVENTION

In accordance with the present invention an air cleaning system which combines the low cost of fiberglass filter systems with the high efficiency of electrostatic air cleaning systems is provided. Its operation does not require the generation of high voltage, thus eliminating the necessity for specialized high voltage generating equipment. An additional advantage of the low voltage of the inventive system is that the danger to life from high voltage shock is greatly reduced. Also, the existence of a fire hazard and the possibility of dust fire caused by arcing across gathered dust particles is eliminated.

In accordance with the present invention, an air cleaner adapted to admit a flow of air containing entrained particles and to remove some of the particles from the air and expel the air and any remaining particles comprises a plurality of non-conductive filter elements. Means are provided for supporting the filter elements in spaced relationship to each other. The filter elements define a plurality of passages for the flow of air. Means for concentrating electrical charges of opposite polarity on facing surfaces of adjacent filter elements is also provided.

In a preferred embodiment of the invention, an air cleaner which comprises first and second electrically conductive filter elements is provided. The first electrically conductive filter element is configured and dimensioned in such a manner that it may be positioned in a flowing air current in a position where the intersection of the filter element and a plane perpendicular to the direction of flow of the air current has an area which is very much smaller than the total surface area of the first filter element. Likewise, the second electrically conductive filter element is configured and dimensioned in such a manner that it also may be positioned in a flowing air current in such a manner that the intersection of the second filter element and a plane perpendicular to the direction of flow of the air current has an area which is very much smaller than the total surface area of the second filter element. Accordingly, a very large number of pairs of filter elements may be employed thus giving the filter a large surface area to collect particles without causing an undue pressure drop across the filter. Support means is provided for supporting the first and second electrically conductive filter elements in a position where at least a portion of the first filter element is in spaced relationship with a portion of the second filter element. The first and second filter elements define a passage for the flow of air. Means are provided for applying voltage of a first polarity to the first filter element and voltage of opposite polarity to the second filter element.

BRIEF DESCRIPTION OF DRAWINGS

A number of ways of carrying out the invention is described in detail below with reference to the drawings which illustrate only examples of specific embodiments of the invention, in which:

FIG. 1 is a perspective view of an air cleaner constructed in accordance with the present invention;

FIG. 2 is a detailed perspective view of the air cleaner illustrated in FIG. 1 showing the details of construction;

FIG. 3 is a schematic diagram of an air cleaning system using the air cleaner illustrated in FIG. 1;

FIG. 4 is a schematic diagram of an air cleaner which operates in a manner similar to the air cleaner illustrated in FIG. 1 though it has a different configuration of filter elements; and FIG. 5 is a perspective view of a portion of an air cleaner having still another geometric configuration, which operates in a manner similar to the air cleaner illustrated in FIG. 1.

DETAILED DESCRIPTION OF THE PREFERRED EMBODIMENTS

Referring to FIG. 1, a filter 10 constructed in accordance with the present invention includes an input face 12 and an output face 14 (not visible). Typically, the filter would be in the order of 7 cm. in thickness and have a face area of 2500 cm$^2$. The filter illustrated in FIG. 1 includes a pair of conductive sides 16 and a pair of non-conductive sides 18. Conductive sides 16 may be made of mylar coated with a conductive layer of metal. A matrix 20 of filter elements is contained within and supported by conductive sides 16 and non-conductive sides 18.

The construction of a typical matrix is illustrated in FIG. 2. The matrix comprises a first plurality of conductive filter elements 22 and a second plurality of conductive filter elements 24. Filter elements 22 and 24 are composed of polymeric film such as that marketed by E. I. Dupont de Nemours under the trademark "MYLAR" having a thickness of approximately 0.0004 cm. and coated with a metallic coating 26 (typically aluminium) which has a thickness of about 2.5 millionths of a centimeter. One end of each of the filter elements 22 is conductively secured to conductive support element 16a by a conductive bonding agent 28. Filter elements 24 are, in like fashion, secured to conductive support 16b (FIG. 3). The shape of matrix 20 is achieved by adhering the uppermost conductive element 24 to non-conductive support 18 in the manner illustrated in FIG. 2. If desired, faces 12 and 14 may be dipped in a tray of lacquer, such as polyurethane, to a depth of 0.5 cm. in order to give the faces added strength. Alternatively, if it is expected that the filter will be used in an environment where the air will be corrosive, the entire filter may be coated by being dipped in polyurethane lacquer.

Matrix 20 is fabricated by forming Mylar film, which is coated with a thin layer of aluminum, under pressure and heat. This may be done by pressing the film against a single heated element. Typically, the matrix is formed with a convolution width 34 of about 0.5 cm. and a distance 36 between elements of about 0.25 cm. Inasmuch as Mylar is a thermoplastic material, the Mylar film will, after it is cooled, remain in the shape into which it has been deformed under pressure. After such cooling has been accomplished, a contact adhesive may be applied to the surfaces of the conductive filter elements 22 and 24 to bond them to each other. The glue is allowed to dry and the matrix 20 is assembled by simply bringing the conductive filter elements into contact with each other. One end of each of the conductive filter elements 22 is then bonded conductively to conductive support 16a and the opposite end of each of the conductive filter elements 24 is bonded to conductive support 16b. The finished matrix may then be supported in a plastic frame during use.

A typical electrical circuit for operation of the filter is illustrated in FIG. 3. The circuit comprises a diode 38 which rectifies the output of an AC source 40. Filtering is provided by a capacitor 42 and a resistor 44. The output of this filtering network is connected to conductive supports 16a and 16b, as illustrated schematically in FIG. 3.

During operation of the filter, voltage is applied to the matrix as indicated schematically in FIG. 3. The voltage applied to conductive support 16a is different from the voltage applied to conductive support 16b. A gradient thus exists in passages 46 defined between adjacent conductive filter elements 22 and 24. Inasmuch as these passages have a relatively small cross-section and are relatively long in length the integral of the gradient acting on a particle passing through the passage with respect to time is high enough to insure that most particles will be attracted to either one conductive element or the other before passing through the filter. This is so despite the fact that the voltage applied to the filter may only be in the order of about a hundred volts. Typically, a filter having elements that have a thickness in the order of 0.001 cm. and three elements per centimeter, will present a surface of resistance to the flow of air that is about one third of one percent of the total surface area of the filter. For example, the resistance of the passages is very low when the ratio of the total surface area of the filter elements 22 and 24 to the sum of these surface areas is greater than 50. By increasing the thickness of the Mylar and/or the number of elements per centimeter, the area of the filters presented to the flow of air through the filter may be increased to 10% of the total area of a face without substantially affecting operation. However, thinner filter elements are more desirable because they are less expensive. Likewise, fewer electrodes, for most applications, will give sufficient efficiency and considerable savings in manufacturing cost. Thus, the particular construction of the inventive filter allows the elements to be put very close to each other, increasing the gradient which one would normally get by applying the same voltage to a conventional filter while at the same time making that gradient more effective by reducing the distance that a particle has to traverse before being caught on the sidewalls of a passage. Still another advantage of the inventive filter is the fact that the material of which it is made is extremely inexpensive.

There are still other advantages to the inventive filter construction. These include the fact that there is no metal-to-metal exposure, thus eliminating the possibility of arcing and consequent fire hazards. This is achieved because all metallic coatings 26 are disposed on the top side of filter elements 22 and 24 and thus face only the non-conductive Mylar surfaces of the underside of adjacent elements as shown most clearly in FIGS. 2 and 5. The flexible nature of the filter also opens up the posibility of retrofitting the device to existing installations by manufacture of a number of standard size filters. Additionally, if the elements are coated entirely with polyurethane lacquer, the filter could be compressed to fit a wide variety of devices without shorting the filter or affecting its operation.

If desired, the filter's life may be extended by putting a rough filter screen at the input face of the filter to remove large particles and a similar screen at the output to discourage reintroduction of particles into the air. These screens would also serve as structural support members. The operating voltage of the filter can be increased without substantially increasing the cost of the equipment by using a solid state voltage multiplier.

FIGS. 4 and 5 illustrate alternative geometries for the inventive filter. Like FIG. 1, they both have a basically corrugated configuration. In FIG. 4, electrically conductive filter elements 24 have the same function and configuration as the corresponding elements in the embodiment illustrated in FIG. 1, while electrically conductive filter elements 22 have a planar configuration. Again, as in FIG. 1, a field exists between the plates when voltage is applied and this attracts charged particles to the plates. In FIG. 5, electrically conductive filter elements 22 and 24 both have the same configuration. An advantage of this configuration is that heat forming may be eliminated, the elements being adhered to each other and, because of the natural resiliency of Mylar, the elements expanded to the illustrated configuration. Adhesion may be accomplished with an adhesive or by heat lamination. Corresponding numbers in FIGS. 4 and 5 designate parts corresponding to parts having the same numbers in FIGS. 1-3. However, in FIG. 5 all supporting members 16a, 16b and 18 are made of relatively thick metal and are insulated electrically from each other by insulators 48.

One advantage of the inventive filter is that in the event that arcing occurs at a given point, due to a defect in manufacture or other cause, the thin metal film in the area where the arcing occurs will be oxidized away. Thus it no longer provides a path for electricity and the arcing cannot occur again at the same point. This aspect of the operation of the inventive filter is similar to the self-healing of Mylar capacitors. Generally, the size of the burned out area is of the same order of magnitude as the width of a strip of the conductive layer which has a current carrying capacity equal to the current through the voltage source driving the filter, when the filter elements are short-circuited to each other.

The various structural features of the inventive air filter are susceptible of some modifications without departing from the spirit and scope of the invention. For example, the Mylar elements may be crimped in a random fashion or otherwise formed in such a manner that they may simply be positioned one on top of the other without precisely controlling the relative position of the layers with respect to each other. Alternatively, the filter may be formed by giving the filter a very fine crimp, either corrugations or random crimping, which has a depth about one-tenth the distance between adjacent filter elements. This would give the filter added strength and a greater surface area. The filter could also be formed by positioning flat metalized Mylar sheets separated from each other by removable insulators, piercing the sheets with a plurality of support bars (such as fine plastic needles with adhesive on them), and removing the removable insulators.

While illustrative embodiments of the present invention have been illustrated, it is of course understood that various modifications will be obvious to those of ordinary skill in the art. Such modifications are within the spirit scope of the invention, which is limited and defined only by the appended claims.

I claim:

1. An air cleaner comprising:
   (a) a plurality of first electrically conductive filter elements configured generally in planes, and positioned in a flowing air current in a position where the intersection of each of said first filter elements and a plane perpendicular to the direction of flow of the air current has an area which is very much smaller than the total surface area of each of the first filter elements;
   (b) a plurality of second electrically conductive filter elements configured generally in planes, and positioned in a flowing air current in a position where the intersection of each of said second filter elements and a plane perpendicular to the direction of flow of the air current has an area which is very much smaller than the total surface area of each of the second filter elements;
   (c) support means for supporting said first and second electrically conductive filter elements in positions where at least a portion of each of said first filter elements is in facing spaced relationship to a portion of one of said second filter elements, said first and second filter elements defining passages for the flow of air therebetween; and
   (d) means for applying a first voltage to said first filter elements and a different voltage to said second filter elements; wherein said first filter elements have a corrugated configuration, and said support means comprises means bonding said first electrically conductive filter elements to said second electrically conductive filter elements to form said elements into a matrix having input and output faces, the mechanical strength of said matrix being increased by a non-conductive supportive material coated on one of said faces.

2. An air cleaner as in claim 1, wherein said first and second electrically conductive filter elements are formed from a deformable planar element.

3. An air cleaner as in claim 1, wherein said first and second electrically conductive filter elements each comprise a thin layer of non-conducting material bonded to a layer of electrically conductive material.

4. An air cleaner as in claim 1, wherein the entire surface area of said electrically conductive filter elements is coated with non-conductive material, whereby said filter elements are protected from corrosion.

5. An air cleaner as in claim 1, wherein the ratio of said total surface area of said first and second filter elements to the sum of said areas is greater than fifty whereby the resistance of the passages is very low.

* * * * *